(12) United States Patent
Ohya et al.

(10) Patent No.: US 12,444,034 B2
(45) Date of Patent: Oct. 14, 2025

(54) TEACHER DATA GENERATION METHOD, TRAINED LEARNING MODEL, AND SYSTEM

(71) Applicant: CANON KABUSHIKI KAISHA, Tokyo (JP)

(72) Inventors: Takeru Ohya, Tokyo (JP); Kazuya Hizume, Kanagawa (JP); Yuta Okabe, Kanagawa (JP); Takayuki Hashimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 488 days.

(21) Appl. No.: 17/713,956

(22) Filed: Apr. 5, 2022

(65) Prior Publication Data

US 2022/0284567 A1    Sep. 8, 2022

Related U.S. Application Data

(63) Continuation of application No. PCT/JP2020/036879, filed on Sep. 29, 2020.

(30) Foreign Application Priority Data

Oct. 8, 2019 (JP) .................................. 2019-185542

(51) Int. Cl.
  *G06T 7/00* (2017.01)
  *G06N 3/045* (2023.01)
  (Continued)

(52) U.S. Cl.
  CPC ........... *G06T 7/0004* (2013.01); *G06N 3/045* (2023.01); *G06N 3/08* (2013.01); *G06T 7/12* (2017.01); *G06T 2207/20081* (2013.01)

(58) Field of Classification Search
  CPC .................... G06T 7/0004; G06T 7/12; G06T 2207/20081; G06T 2207/10024;
  (Continued)

(56) References Cited

U.S. PATENT DOCUMENTS 6,141,437 A * 10/2000 Xu ......................... G06T 7/0012
                                                              382/172
6,240,201 B1 * 5/2001 Xu ......................... G06T 7/0012
                                                              382/128
(Continued)

FOREIGN PATENT DOCUMENTS

CN        107833220 A     3/2018
CN        108711148 A    10/2018
                  (Continued)

OTHER PUBLICATIONS

Matsuoka, et al. "A study on a multiple lighting image data enhancement system for DNN-based automated precise timepiece part visual inspection", Computer Science & Technology Journal, vol. 45, No. 8 (Issue No. 506), Aug. 1, 2019.

(Continued)

*Primary Examiner* — Xuemei G Chen
(74) *Attorney, Agent, or Firm* — Canon U.S.A., Inc. IP Division

(57) ABSTRACT

According to one aspect of the present invention, a method of generating teacher data for image recognition includes acquiring image data by capturing an image of a workpiece, and segmenting the image data into a plurality of first areas, marking whether predetermined information is included in each of the plurality of first areas, and generating a plurality of pieces of teacher data.

8 Claims, 12 Drawing Sheets

(51) Int. Cl.
*G06N 3/08* (2023.01)
*G06T 7/12* (2017.01)

(58) Field of Classification Search
CPC . G06T 2207/20084; G06T 2207/30164; G06T 7/0002; G06T 1/0007; G06T 7/11; G06N 3/045; G06N 3/08; G06N 20/00; G01N 2021/8883; G01N 21/88

See application file for complete search history.

(56) References Cited

U.S. PATENT DOCUMENTS

| | | | |
|---|---|---|---|
| 6,399,953 B1 | 6/2002 | Kitamura | |
| 10,453,366 B2 | 10/2019 | Zhang | |
| 10,776,909 B2 | 9/2020 | Ikeda | |
| 2007/0009152 A1 | 1/2007 | Kanda | |
| 2008/0092088 A1* | 4/2008 | Nehmadi | G01N 23/225 716/54 |
| 2010/0141754 A1* | 6/2010 | Hiraoka | G01N 21/8986 348/93 |
| 2011/0274321 A1* | 11/2011 | Kono | G06T 7/0012 382/128 |
| 2017/0047195 A1* | 2/2017 | Lee | H01L 22/12 |
| 2018/0173961 A1* | 6/2018 | Jain | G06T 7/40 |
| 2018/0197048 A1* | 7/2018 | Micks | G06N 3/08 |
| 2018/0301071 A1 | 10/2018 | Zhang | |
| 2019/0011252 A1* | 1/2019 | Moeller | B05C 21/00 |
| 2019/0026906 A1* | 1/2019 | Kawai | G06T 7/254 |
| 2019/0073566 A1* | 3/2019 | Brauer | G06V 10/776 |
| 2019/0147586 A1 | 5/2019 | Ikeda | |
| 2019/0219507 A1* | 7/2019 | Diamond | G06T 5/50 |
| 2019/0281199 A1* | 9/2019 | Müller | G01S 17/894 |
| 2019/0354019 A1* | 11/2019 | Freytag | G01Q 30/02 |
| 2020/0033842 A1* | 1/2020 | Masuda | G05B 19/4183 |
| 2020/0090314 A1* | 3/2020 | Mayr | G06F 18/40 |
| 2020/0134810 A1* | 4/2020 | Lee | G06T 7/0006 |
| 2020/0193588 A1* | 6/2020 | Brauer | G06V 10/764 |
| 2020/0250814 A1* | 8/2020 | Stoval, III | G06N 3/04 |
| 2020/0265575 A1* | 8/2020 | Oota | G01N 21/8851 |
| 2020/0265576 A1* | 8/2020 | Sasaki | G06T 5/77 |
| 2020/0279359 A1* | 9/2020 | Kimura | G06T 1/60 |
| 2020/0296335 A1* | 9/2020 | Han | H04N 23/66 |
| 2020/0371046 A1* | 11/2020 | Wang | H01L 21/50 |
| 2021/0012476 A1* | 1/2021 | Miyazawa | G06T 7/001 |
| 2021/0034961 A1* | 2/2021 | Lovell | G06F 30/20 |
| 2021/0049740 A1* | 2/2021 | Cho | G06T 3/4046 |
| 2021/0065344 A1* | 3/2021 | Hirai | G06T 7/001 |
| 2021/0089749 A1* | 3/2021 | Amthor | G06T 5/70 |
| 2021/0118118 A1 | 4/2021 | Yoshida | |
| 2021/0247324 A1* | 8/2021 | Naruse | G06N 3/045 |
| 2021/0308782 A1* | 10/2021 | Sakurai | B23K 9/173 |
| 2021/0326648 A1* | 10/2021 | Tsuchiya | G06F 18/214 |
| 2021/0364447 A1* | 11/2021 | Naruse | G06T 7/001 |
| 2022/0067902 A1* | 3/2022 | Dou | G06T 7/001 |
| 2022/0138949 A1* | 5/2022 | Enzmann | G06T 7/0016 382/128 |

FOREIGN PATENT DOCUMENTS

| | | |
|---|---|---|
| CN | 108734696 A | 11/2018 |
| CN | 109871895 A | 6/2019 |
| JP | 2005-156334 A | 6/2005 |
| JP | 2017-173098 A | 9/2017 |
| JP | 2018-164272 A | 10/2018 |
| JP | 2018-180545 A | 11/2018 |
| JP | 2019-091249 A | 6/2019 |
| JP | 2019-125204 A | 7/2019 |
| WO | 2019146538 A1 | 8/2019 |

OTHER PUBLICATIONS

Ikeda, et al. "AI Technology-Based Visual Inspection Automation (AI Visual Inspection System)", Image Laboratory ssued in Jun. 2019 (pp. 6-11).

Makoto, "Deep Learning Struggles of IT-Based Farmhouse", IT-for-Agriculture Corner Studies on Effective Learning, Interface Issued in Aug. 2019 pp. 142-145.

Wang, Long, et al.; "A Two-Stage Data-Driven Approach for Image-Based Wind Turbine Blade Crack Inspections"; IEEE/ASME Transactions on Mechatronics; vol. 24, No. 3; Jun. 1, 2019; XP011730085; ISSN: 1083-4435; DOI: 10.1109/TMECH. 2019. 2019.2908233; pp. 1271-1281.

Tian, Yunong, et al.; "An image processing method for green apple lesion detection in natural environment based on GA-BPNN and SVM"; 2018 IEEE International Conference on Mechatronics and Automation (ICMA); IEEE; Aug. 5, 2018; XP033416018; DOI: 10.1109/ICMA.2018.8484624; pp. 1210-1215.

Sindagi, Vishwanath A., et al.; "Domain Adaptation for Automatic OLED Panel Defect Detection Using Adaptive Support Vector Data Description"; arxiv.org, Cornell University Library; vol. 122, No. 2; Sep. 23, 2016; XP036175445; pp. 193-211.

Bonnin-Pascual, Francisco, et al.:"On the use of robots and vision technologies for the inspection of vessels: A survey on recent advances"; Ocean Engineering, Pergamon, Amsterdam, NL; vol. 190; Sep. 12, 2019; XP085867620.

* cited by examiner

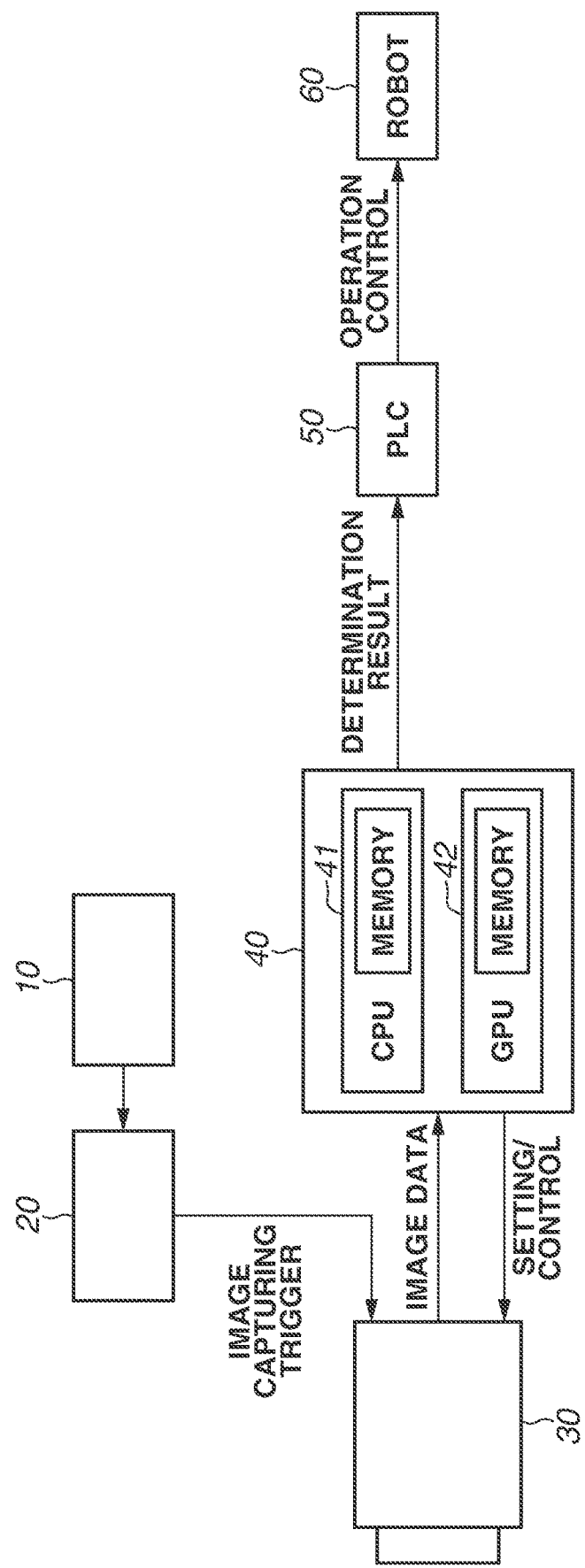

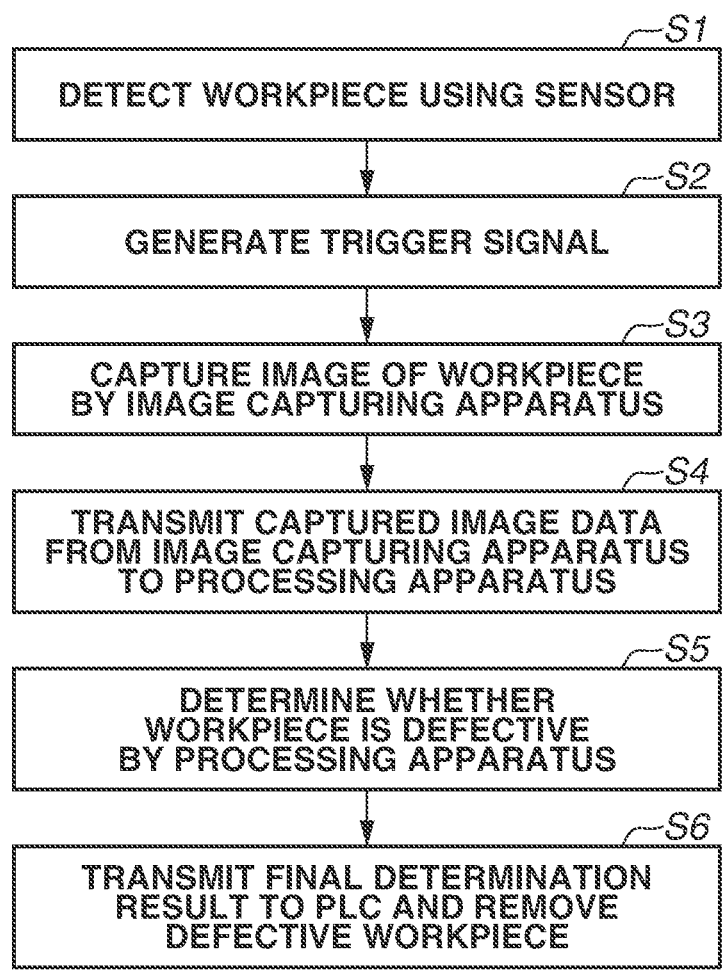

LEARNING PHASE

ESTIMATION PHASE

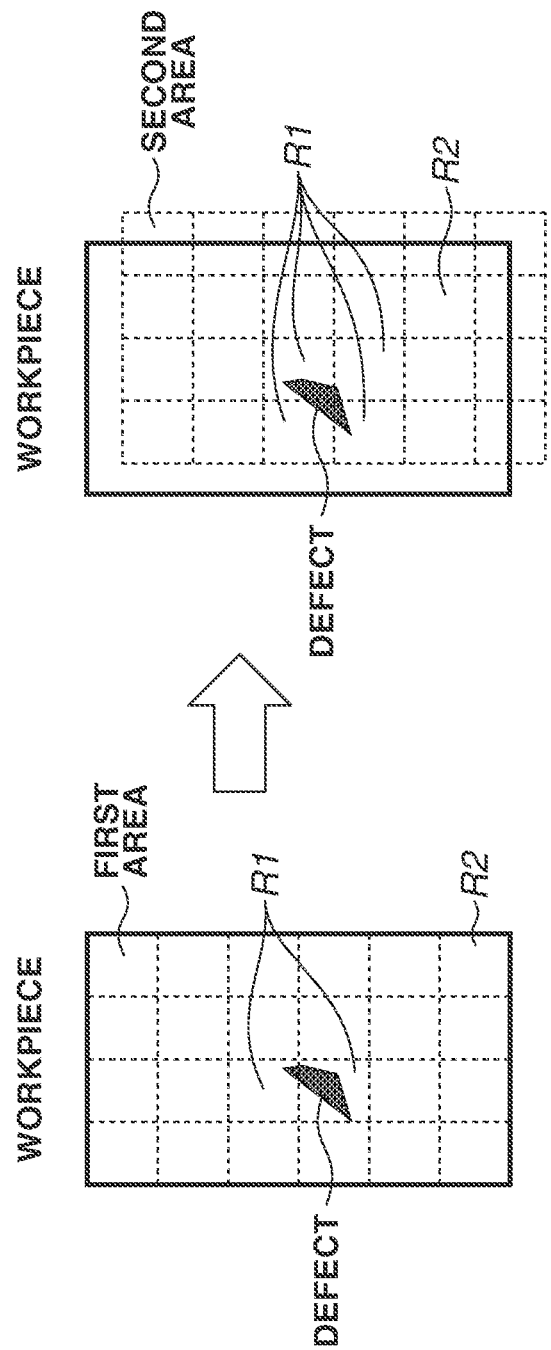

LEARNING PHASE

INFERENCE PHASE

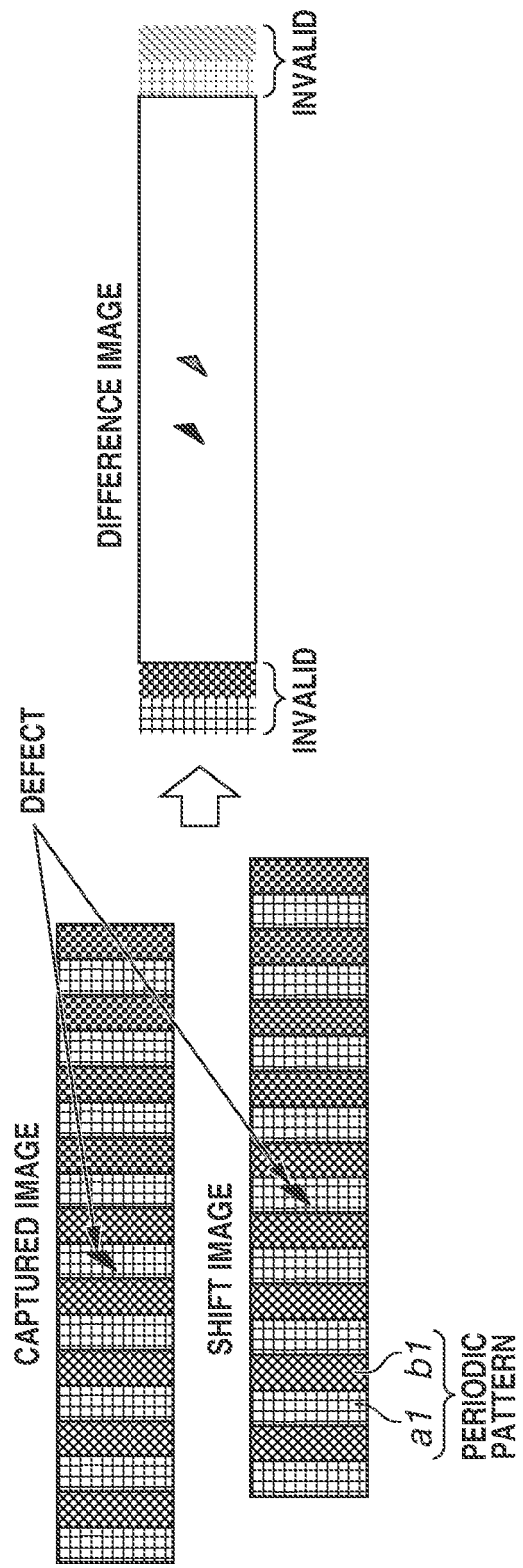

FIG.10A   CAPTURED IMAGE
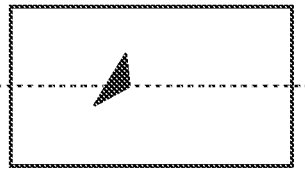
FIG.10B   DEFECTIVE IMAGE
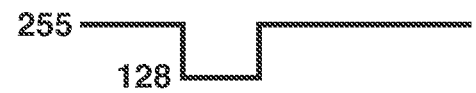
FIG.10C   SHIFT IMAGE
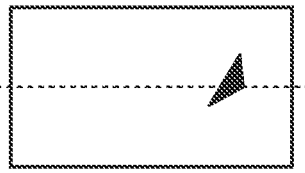
FIG.10D   SHIFT IMAGE
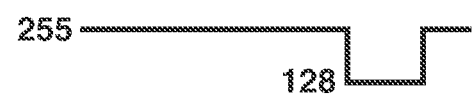
FIG.10E   DIFFERENCE IMAGE
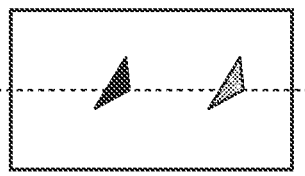

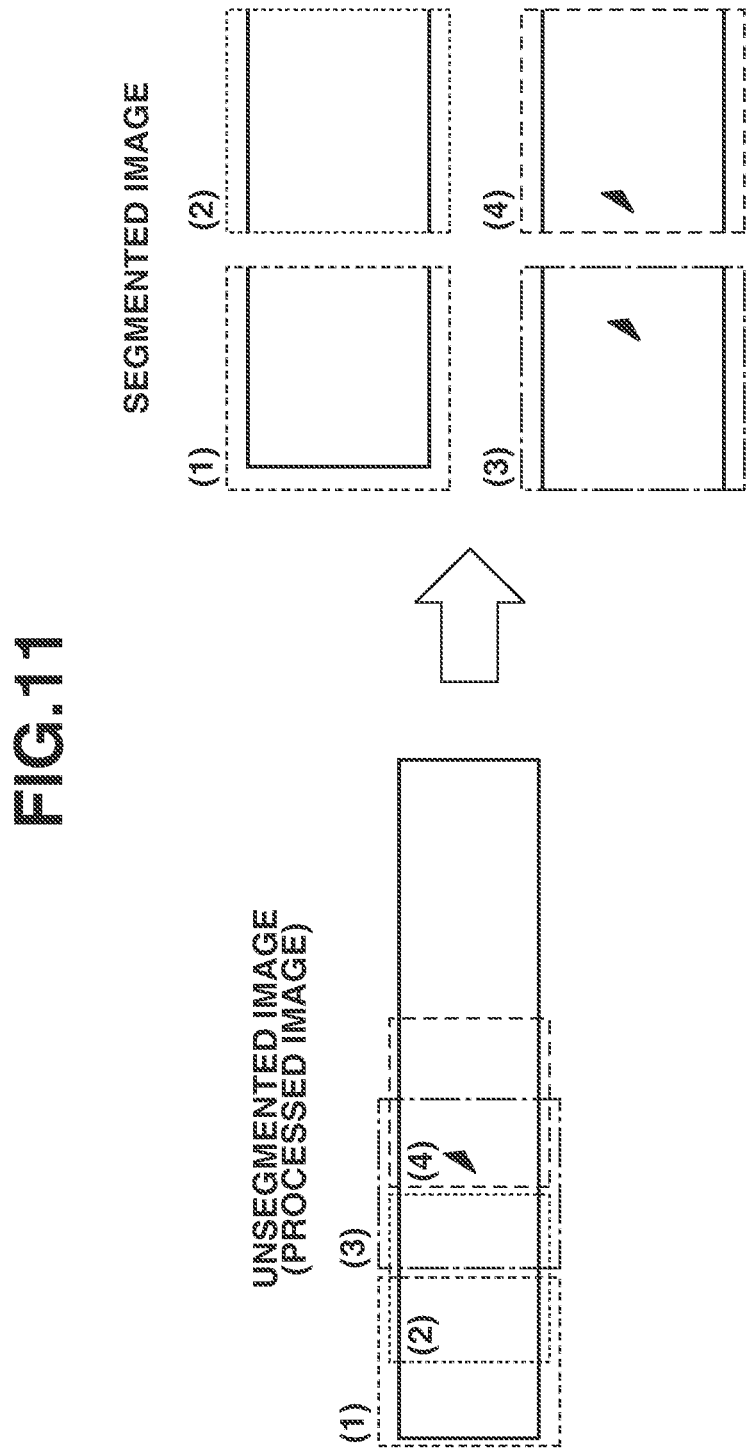

TEACHER DATA GENERATION METHOD, TRAINED LEARNING MODEL, AND SYSTEM

CROSS-REFERENCE TO RELATED APPLICATIONS

This application is a Continuation of International Patent Application No. PCT/JP2020/036879, filed Sep. 29, 2020, which claims the benefit of Japanese Patent Application No. 2019-185542, filed Oct. 8, 2019, both of which are hereby incorporated by reference herein in their entirety.

BACKGROUND OF THE INVENTION

Field of the Invention

The present invention relates to a teacher data generation method, a trained learning model, and a system.

Background Art

A system for recognizing each product (workpiece) produced in a factory is known. Examples of such a system include an inspection system in which a defect is recognized by a machine, instead of using a visual check by a human, based on image data acquired by an image capturing apparatus to determine whether each product is defective or non-defective in a workpiece appearance inspection. Patent Literature 1 discusses an inspection system in which an image capturing apparatus captures an image of a workpiece and a processing apparatus composed of artificial intelligence receives image data obtained by the image capturing apparatus and conducts a defect inspection.

CITATION LIST

Patent Literature

PTL 1: Japanese Patent Application Laid-Open No. 2018-164272

A trained model is generated when an inspection is conducted using artificial intelligence, like in the inspection system discussed in Patent Literature 1. In Patent Literature 1, teacher data including a plurality of non-defective images and a plurality of defective images is input to a learning model to generate the trained model. In Patent Literature 1, a number of non-defective images and a number of defective images that correspond to the number of pieces of teacher data are required. The present invention is directed to obtaining a number of pieces of teacher data required for defective or non-defective determination, while reducing the number of pieces of image data.

SUMMARY OF THE INVENTION

According to one aspect of the present invention, a method of generating teacher data for image recognition includes acquiring image data by capturing an image of a workpiece, and segmenting the image data into a plurality of first areas, marking whether predetermined information is included in each of the plurality of first areas, and generating a plurality of pieces of teacher data.

According to another aspect of the present invention, a learning method, includes inputting image data including a first portion with a first background color and a second portion with a second background color different from the first background color, training by machine learning using a plurality of pieces of teacher data marking whether predetermined information is included in each of a plurality of first areas in the first portion, and training by machine leaning using a plurality of pieces of teacher data marking whether the predetermined information is included in each of the plurality of first areas in the second portion.

According to still another aspect of the present invention, a system includes an image capturing apparatus and a processing apparatus including a learning model configured to receive image data obtained by capturing an image by the image capturing apparatus. The processing apparatus includes a trained learning model marking whether predetermined information is included in each of a plurality of first areas in image data obtained by capturing an image of a first workpiece by the image capturing apparatus, inputs second image data obtained by capturing an image of a second workpiece by the image capturing apparatus to the trained learning model, and makes a determination on the second workpiece based on the second image data.

According to still another aspect of the present invention, a system includes an image capturing apparatus and a processing apparatus including a learning model configured to receive image data obtained by capturing an image by the image capturing apparatus. The processing apparatus includes a trained learning model including a difference image between image data obtained by capturing an image of a non-defective workpiece by the image capturing apparatus and image data obtained by capturing an image of a defective workpiece by the image capturing apparatus, inputs a difference image between second image data obtained by capturing an image of a second workpiece by the image capturing apparatus and image data obtained by capturing an image of the non-defective workpiece to the trained learning model, and makes a determination on the second workpiece.

Further features of the present invention will become apparent from the following description of exemplary embodiments with reference to the attached drawings.

BRIEF DESCRIPTION OF THE DRAWINGS

FIG. 1 is a diagram illustrating an outline of a system.

FIG. 2 is a flowchart illustrating a system processing flow.

FIG. 4 is an explanatory diagram illustrating a teacher data generation method according to a first exemplary embodiment.

FIG. 9 is an explanatory diagram illustrating the teacher data generation method according to the third exemplary embodiment.

FIG. 10A is an explanatory diagram illustrating the teacher data generation method according to the third exemplary embodiment.

FIG. 10B is an explanatory diagram illustrating the teacher data generation method according to the third exemplary embodiment.

FIG. 10C is an explanatory diagram illustrating the teacher data generation method according to the third exemplary embodiment.

FIG. 10D is an explanatory diagram illustrating the teacher data generation method according to the third exemplary embodiment.

FIG. 10E is an explanatory diagram illustrating the teacher data generation method according to the third exemplary embodiment.

FIG. 11 is an explanatory diagram illustrating the teacher data generation method according to the third exemplary embodiment.

DESCRIPTION OF THE EMBODIMENTS

Figure 3A:
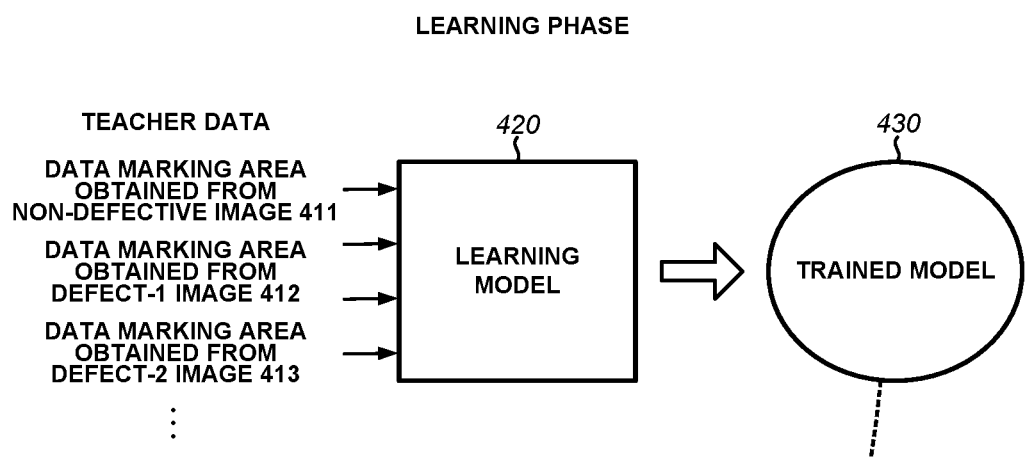
FIGS. 3A-B are diagrams respectively illustrating a learning phase and an estimation phase.

The following exemplary embodiments embody the technical idea of the present invention, and are not intended to limit the present invention. Some of the sizes and positional relationships of members illustrated in the drawings are exaggerated for clarity of description. In the following description, the same components are denoted by the same reference numerals, and descriptions thereof may be omitted.

FIG. 1 illustrates a basic configuration of an inspection system as an example of a system. A system according to an exemplary embodiment of the present invention can be used not only as an inspection system, but also as various systems. Examples of various systems include an image recognition system for identifying whether a specific item is present in image data, and an automatic sorting system in a delivery center.

The inspection system according to the present exemplary embodiment will be described along with a processing flow illustrated in FIG. 2.

(Image Capturing Apparatus)

First, a sensor 10 is used to detect whether a workpiece (object) is present within a predetermined range (FIG. 2: S1). The sensor 10 is, for example, a sensor for detecting a workpiece moving at a high speed on a production line. For example, an infrared sensor is used. When the sensor 10 detects a workpiece within the predetermined range, the sensor 10 outputs a signal to a trigger generation circuit 20. The trigger generation circuit 20 generates an image capturing trigger signal based on the signal from the sensor 10 (FIG. 2: S2).

The trigger generation circuit 20 is composed of a logic circuit such as a field programmable gate array (FPGA) or an application specific integrated circuit (ASIC). The trigger generation circuit 20 performs hardware processing on the signal received from the sensor 10, and transmits the image capturing trigger signal that has undergone hardware processing to an image capturing apparatus 30. Then, the image capturing apparatus 30 captures an image of a workpiece (FIG. 2: S3).

According to the present exemplary embodiment, the trigger generation circuit 20 is composed of a logic circuit and is subjected to parallel processing by hardware processing. The signal from the trigger generation circuit 20 is input to the image capturing apparatus 30 without involving software processing. Accordingly, a useless delay is less likely to occur, unlike in software processing for performing sequential processing. It may be desirable to transmit the trigger signal from the trigger generation circuit 20 to the image capturing apparatus 30 by wire.

The image capturing apparatus 30 includes a lens unit, an image sensor, a signal processing unit that processes a signal output from the image sensor, an output unit that outputs image data generated by the signal processing unit, and an input unit that receives the trigger signal.

When the trigger signal is input to the input unit, the image capturing apparatus 30 starts image capturing. The lens unit is provided detachably from the image capturing apparatus. An appropriate lens unit can be selected depending on the size of an object or an image capturing scene. The signal processing unit generates image data from the signal output from the image sensor. The output unit outputs the image data generated by the signal processing unit.

The image sensor is an element in which photoelectric conversion units are arranged in an array, and is, for example, a complementary metal-oxide semiconductor (CMOS) sensor. The image sensor may be a rolling shutter type image sensor in which start and end timings of an exposure period are different in each row, or may be a global electronic shutter type image sensor in which start and end timings of the exposure period are the same in all rows.

(Processing Apparatus 40)

The image data output from the image capturing apparatus 30 is input to a processing apparatus 40 and estimation processing is performed on the image data (FIG. 2: S4). The processing apparatus 40 performs estimation processing on the object in the image data. In this case, processing depending on the intended use of the system is performed as estimation processing on the object in the image data. Appearance inspection processing for determining whether a workpiece to be subjected to image capturing is defective will be described below as estimation processing. In addition, for example, in the case of a system for identifying whether a specific object is present in the image data, identification processing corresponds to the estimation processing. In the case of an automatic sorting system, for example, processing of discriminating a workpiece depending on the size of the workpiece corresponds to the estimation processing. It may be desirable to transmit the image data from the image capturing apparatus 30 to the processing apparatus 40 by wire.

The processing apparatus 40 includes a trained model and determines whether a workpiece is defective or non-defective using the trained model. A graphics processing unit (GPU) 42 can efficiently perform calculations by performing parallel processing on a larger amount of data. Therefore, the GPU 42 can perform processing for learning using a learning model, such as machine learning or deep learning using a plurality of layers of neural network. Note that machine learning or deep learning may be performed on a cloud, instead of performing machine learning or deep learning in the processing apparatus 40. If machine learning or deep learning is performed on a cloud, the processing speed for machine learning or deep learning can be increased. Accordingly, in the present exemplary embodiment, not only a central processing unit (CPU) 41, but also the GPU 42 is used for processing in the processing apparatus 40. Specifically, in the case of executing a learning program including a learning model, the CPU 41 and the GPU 42 perform learning by performing calculations in cooperation. Note that calculations for processing in the processing apparatus 40 may be performed by only one of the CPU 41 and the GPU 42. The learning program including the learning model may be performed on a cloud.

The CPU 41 and the GPU 42 include respective memories, and these memories hold the image data output from the image capturing apparatus. As described above, the trigger generation circuit 20 causes the memories of the CPU 41 and the GPU 42 to hold image data at the same time. Note that the processing apparatus 40 may include a memory that is different from the memory of the CPU 41 and a main memory of the GPU 42. In this case, the image data is held in the main memory. Then, as needed, the image data held in the main memory is written into the memory of the CPU 41 and the memory of the GPU 42.

The GPU 42 accesses the image data held in the memory and processes the image data in parallel. The GPU 42 determines whether a workpiece is defective using the trained model. The GPU 42 is more suitable for performing an enormous amount of typical calculation processing than the CPU 41. According to the GPU 42, the estimation processing can be performed rapidly.

The processing apparatus 40 determines whether a defect is present in an area of image data based on the image data acquired by the image capturing apparatus 30 (FIG. 2: S5). As a result of determination performed by the processing apparatus 40, if the final determination result to be output to a programmable logic controller (PLC) 50 indicates that a defect is present in the workpiece, the PCL 50 inputs a signal for operation control to a robot 60. The robot 60 switches a workpiece movement operation and causes the workpiece determined to be defective to move from the production line (FIG. 2: S6).

When the determination result is output from the processing apparatus 40 to the PLC 50, high-speed signal transmission is not required. Accordingly, the signal transfer can be performed using, for example, wired or wireless communication of general-purpose standards such as Ethernet®. (Trained Model 430)

Figure 3B:
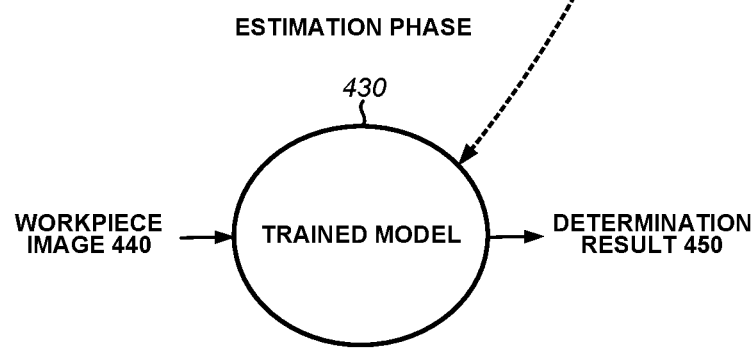
Figure 5:
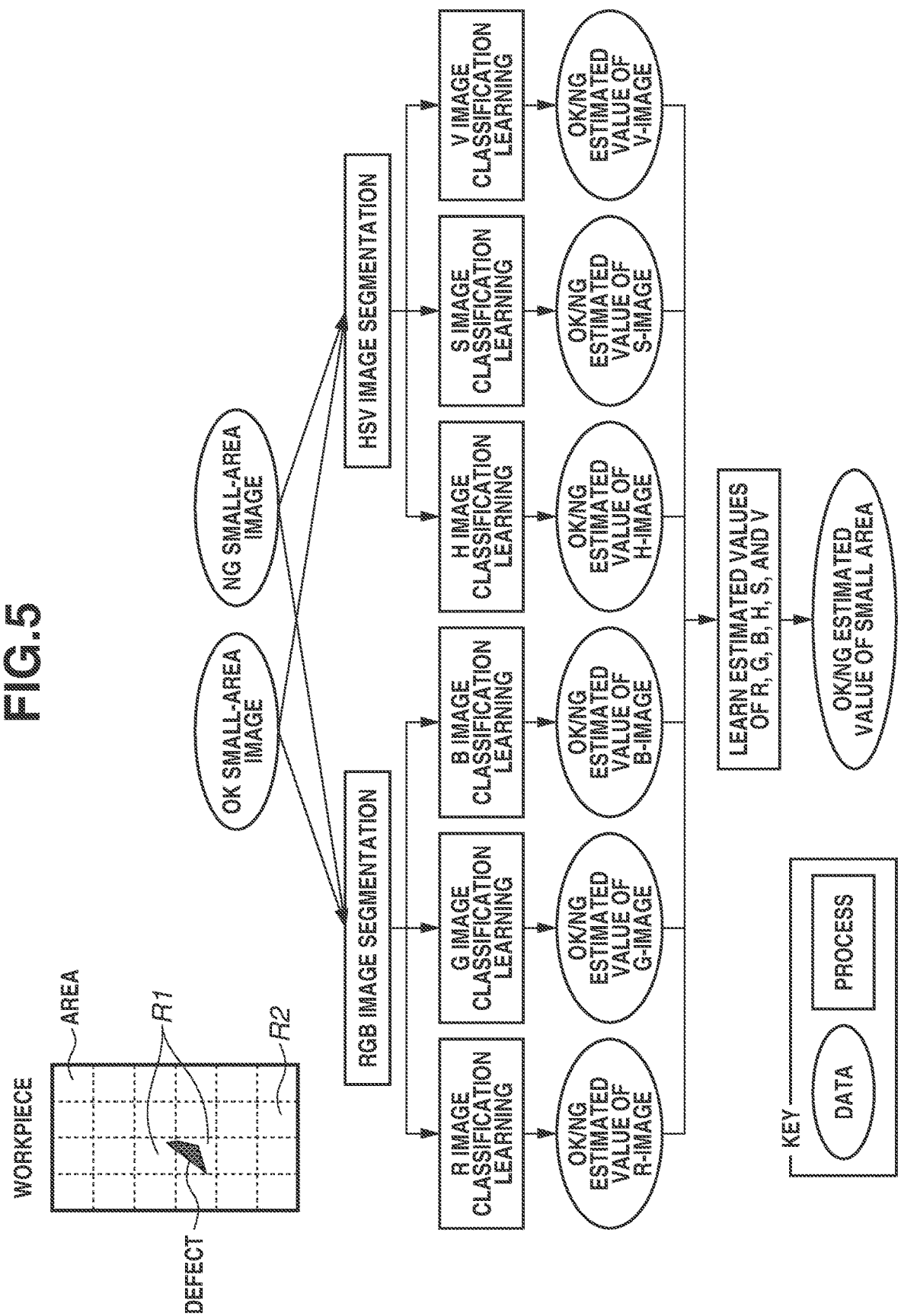
FIG. 5 is an explanatory diagram illustrating the teacher data generation method according to the first exemplary embodiment.
Figure 6:
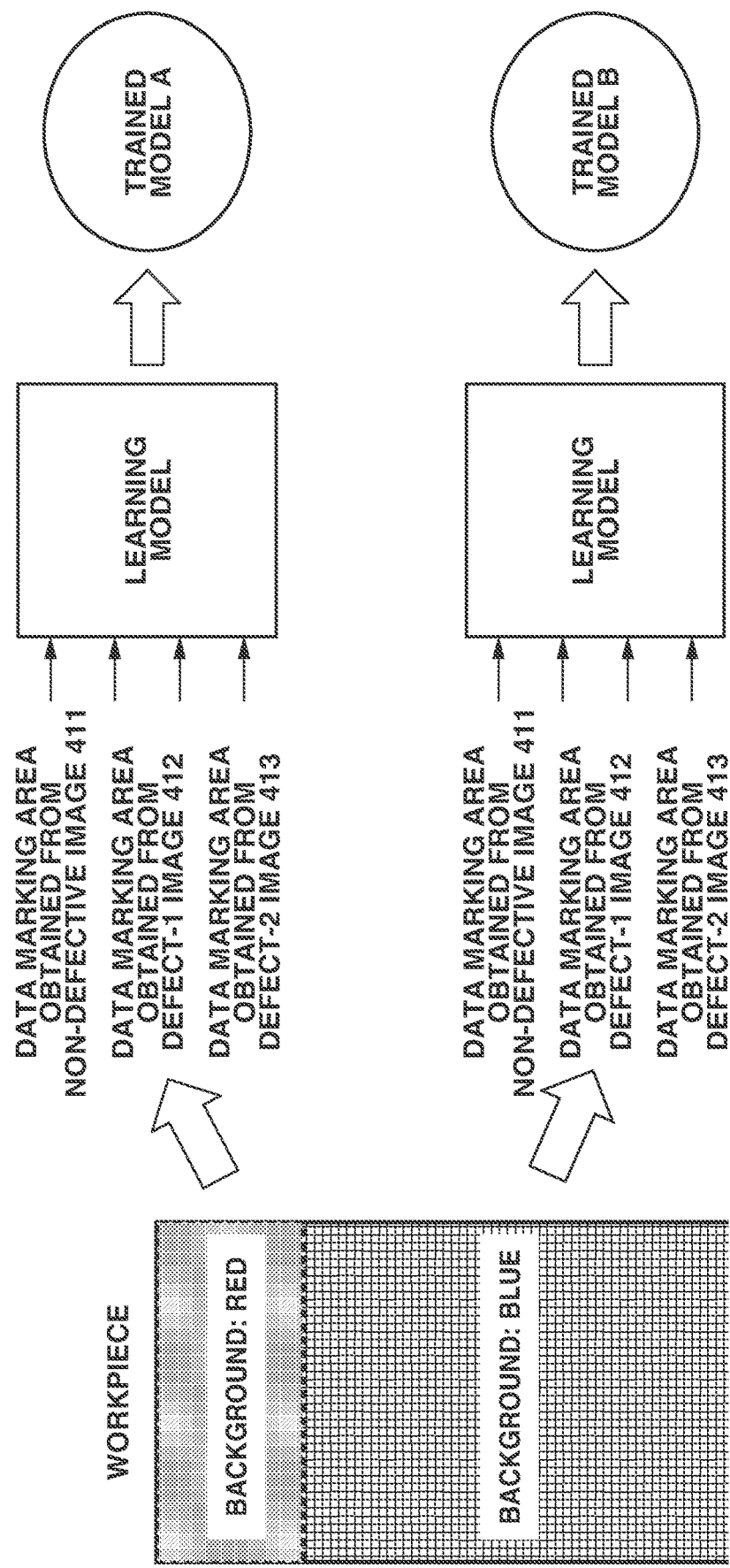
FIG. 6 is an explanatory diagram illustrating the teacher data generation method according to the first exemplary embodiment.

FIGS. 3A-B are explanatory diagrams each illustrating AI for workpiece defect determination performed by the CPU 42 in the processing apparatus 40. FIGS. 4, 5, and 6 are explanatory diagrams each illustrating a teacher data generation method in a learning phase.

FIG. 3A is a conceptual diagram illustrating the learning phase. Teacher data is input to a learning model 420, thereby forming a defect determination algorithm. As described in detail below with reference to FIGS. 4, 5, and 6, the teacher data is image data obtained by segmenting one piece of image data into a plurality of areas. In the case of performing supervised learning, the teacher data is data marking whether predetermined information is included in each of a plurality of areas obtained from one piece of image data. The predetermined information indicates, for example, whether a defect is present. Examples of the case of indicating whether a defect is present include a case of indicating whether metal is peeled when the workpiece is a part with a metallic surface, and a case of indicating whether the workpiece is colored with a color different from a predetermined color when the workpiece is a colored part. A trained model 430 is obtained by inputting the teacher data to the learning model 420, changing the algorithm by a backpropagation method or the like, and training the learning model to output highly accurate information on whether the predetermined information is present. This learning phase processing is performed by at least one of the CPU 41 and the GPU 42. The learning phase processing may be desirably performed on a cloud. In a case where the learning phase processing is performed in the processing apparatus 40, the processing apparatus 40 is required to have a performance of a certain level or higher. On the other hand, in a case where the learning phase processing is performed on a cloud, the workpiece defect determination can be performed regardless of the performance of the processing apparatus 40.

As a specific learning algorithm, machine learning such as a nearest neighbor method, a naive Bayes method, a decision tree, or a support-vector machine may be used. Alternatively, deep learning in which a feature amount and a connection weighting coefficient are generated using a neural network may be used as the learning algorithm. For example, a convolutional neural network model (CNN model) may be used as a deep learning model.

FIG. 3B is a conceptual diagram illustrating an estimation phase. When a workpiece image 440 is input to the trained model 430 that is constructed in the learning phase, a determination result 450 indicating whether a defect is present is output. Processing using the trained model 430 is executed by the GPU 42. Specifically, the workpiece image 440 is image data obtained by capturing an image of a workpiece to be inspected by the image capturing apparatus 30.

First Exemplary Embodiment

Next, a teacher data generation method according to a first exemplary embodiment will be described with reference to FIG. 4.

First, image data obtained by capturing images of a non-defective workpiece, a workpiece including a first defect, a workpiece including a second defect different from the first defect, and the like is prepared. One piece of image data is segmented into a plurality of areas (first areas) and each of the areas is marked to indicate whether predetermined information is included in each area.

In FIG. 4, the first areas are classified into an area R1 including a defect and a non-defective area R2 including no defect. Data on each marked area is input to the learning model. According to the present exemplary embodiment, teacher data is created by segmenting image data into a plurality of areas, thereby obtaining a plurality of pieces of teacher data from one piece of image data. Accordingly, even when only a small number of pieces of image data can be used to create teacher data, the accuracy of workpiece estimation processing on the image data can be increased. In addition, learning can be performed without lowering the resolution in each area including a defect, and thus the determination accuracy can be enhanced.

According to the present exemplary embodiment, the same image data is segmented into a plurality of second areas by shifting a segmented position and the second areas are classified into the area R1 and the area R2, and then marked area data is input to the learning model. This leads to an increase in the number of pieces of teacher data to be obtained from one piece of image data. According to the present exemplary embodiment, the plurality of areas R1 in which the defect position is shifted can be generated from one piece of image data, which leads to a further increase in the number of pieces of teacher data to be obtained from a single image. While FIG. 4 illustrates one image obtained by shifting the segmented position, it may be desirable to increase the number of pieces of teacher data by gradually shifting the segmented position.

The segmented position for the plurality of areas may be rotated. This may lead to an increase in the number of pieces of teacher data to be obtained from one piece of image data.

Image data obtained by capturing an image of a workpiece by changing XY coordinates of the workpiece and image data obtained by capturing an image of a workpiece by rotating the workpiece may also be used as teacher data. These pieces of image data are input to the learning model as teacher data, thereby making it possible to perform defective or non-defective determination without lowering the determination accuracy even when the workpiece is shifted from a predetermined position.

FIG. 5 is a flowchart illustrating teacher data generation processing according to the present exemplary embodiment. In the present exemplary embodiment, each of the areas illustrated in FIG. 4 is separated into a plurality of components and information about the separated components is used as teacher data. In other words, each area is separated into a plurality of components and each of the plurality of components is input to a learning model to thereby generate a trained model. The plurality of components includes a color component, hue (H), saturation (S), and value (V). The values of these components are obtained and the trained model performs estimation processing based on the values. This leads to an improvement in the determination accuracy of the trained model.

First, each of the defective areas R1 and non-defective areas R2 illustrated in FIG. 5 is separated into color image data, H image data, S image data, and V image data. Specifically, the color image data includes red (R) image data, green (G) image data, and blue (B) image data.

The learning model is trained with data on the areas R1 and data on the areas R2. In this case, the data is learned by marking defective or non-defective information on each image group. In other words, classification learning for two classes, i.e., defective or non-defective, is performed on each image data. As a result, a trained model is generated by learning estimated values indicating defective or non-defective of R, G, B, H, S, and V images. In the estimation phase, the obtained estimated values are compared with the data on the image of the workpiece, thereby performing defective or non-defective determination.

In the present exemplary embodiment, if different background designs are used, the above-described trained model is created for each design. For example, FIG. 6 illustrates a case where different background colors are used as background designs. In FIG. 6, a workpiece including a red background area (first portion) and a blue background area (second portion) is used. In FIG. 6, a trained model A obtained by learning a first portion of captured image data and a trained model B obtained by learning a second portion of captured image data are generated. In other words, trained models are generated for the respective background designs. If different background designs are used, there is a possibility that defective or non-defective determination cannot be accurately performed without increasing the number of pieces of teacher data to be input to the trained models. For example, when the workpiece is a colored part, the variation of each color when an area with a red background is colored with a color other than red is different from that when an area with a blue background is colored with a color other than blue. Thus, when the areas have different respective background colors, and the areas are colored with different respective colors, the number of pieces of teacher data used to increase the accuracy of the trained model tends to increase as compared with a case where only one of the background color of each area or the color of each area is different. Like in the present exemplary embodiment, if the trained model is generated for each background color, it is only necessary to perform defective or non-defective determination. Therefore, defective or non-defective determination can be performed based on a predetermined number of pieces of teacher data.

Note that in the above description, background colors are used as background designs. The background designs include not only background colors, but also a difference in background pattern or background material.

In the above description, the non-defective workpiece, the workpiece including the first defect, and the workpiece including the second defect are used as workpieces. However, a workpiece including at least one defect may be used. Also, in this case, a plurality of pieces of teacher data including different defect positions can be obtained by segmenting image data into a plurality of areas. On the other hand, for example, when the workpiece is a colored part, the shape of a defect may vary. The use of a plurality of workpieces including different types of defects with different shapes or the like as described above makes it possible to improve the accuracy of defective or non-defective determination.

In the above description, data marking each area obtained from a non-defective image 411 is input as teacher data. However, this data can be omitted. For example, data marking each area obtained from a defect-1 image 412 and data on each area obtained from a defect-2 image 413 may be used as teacher data. This is because information about the non-defective area R2 in each area obtained from the defect-1 image 412 and each area obtained from the defect-2 image 412 can be input as teacher data.

In FIG. 1, the processing apparatus 40 generates a trained model, but instead a generated trained model may be input to the processing apparatus 40. For example, image data obtained by capturing an image by the image capturing apparatus may be transmitted to an information terminal, and the information terminal may generate a trained model. The trained model with a predetermined accuracy or more may be input to the processing apparatus 40. The information terminal is, for example, a computer such as a personal computer.

In the above description, color image data, hue data, and the like are input to the learning model. However, input data is not limited to this example. For example, calculation parameters may be adjusted for each color and a trained model may be generated based on the data.

Second Exemplary Embodiment

Figure 7:
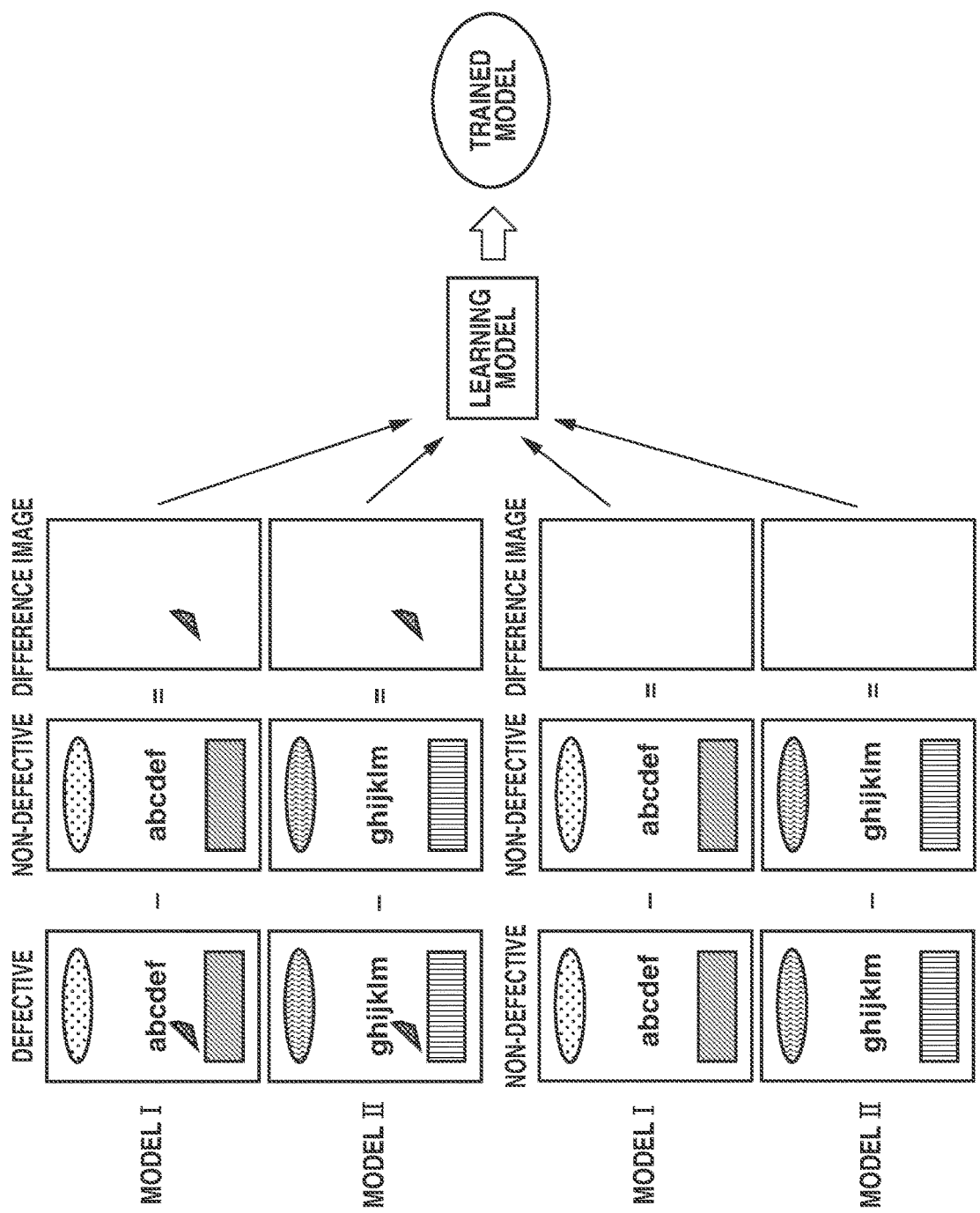
FIG. 7 is an explanatory diagram illustrating a teacher data generation method according to a second exemplary embodiment.

FIG. 7 illustrates a trained model generation method according to a second exemplary embodiment. The present exemplary embodiment differs from the first exemplary embodiment in that difference information indicating a difference between a defective workpiece and a non-defective workpiece is input to a learning model. Matters other than the matters to be described below are similar to those of the first exemplary embodiment.

As illustrated in FIG. 7, in a case where colored parts are used as workpieces, different characters or designs may be printed on the workpieces of different respective models, even when the workpieces have the same shape or the same background color. In this case, if trained models are created for all models, an enormous number of pieces of teacher data are required. On the other hand, in the present exemplary embodiment, the trained model is generated based on difference information indicating a difference between defective image data and non-defective image data. Specifically, as for a model 1, difference information indicating a difference between defective image data (first workpiece captured image data) and non-defective image data (third workpiece captured image data) is input to the learning model as information about the defective workpiece. Further, difference information indicating a difference between non-defective image data (second workpiece captured image data) and non-defective image data (fourth workpiece captured image data) is input to the learning model as information about the non-defective workpiece. This processing is performed on each model, thereby generating the trained model.

It may be desirable to perform image alignment by pattern matching or the like between defective image data and non-defective image data, prior to generation of difference information, and then generate difference information. This leads to an improvement in the accuracy of difference information. When a part on which a label is printed is used as a workpiece, it may be desirable to generate difference information by aligning the labels on the respective workpieces. The alignment of label positions makes it possible to accurately perform defective or non-defective determination even when the label position is shifted in each workpiece.

In the present exemplary embodiment, even when defective or non-defective determination is performed using a trained model, difference information indicating a difference between non-defective image data and image data obtained by actually capturing an image of a workpiece is generated and input to the trained model, and then the defective or non-defective determination result is output from the trained model.

According to the present exemplary embodiment, even when different characters or designs are printed on workpieces of different respective models, defective or non-defective determination can be performed using the same trained model.

In FIG. 7, difference information about different models is input, but instead difference information may be generated for a plurality of defects in the same model and the generated difference information may be input. In the estimation phase, difference information indicating a difference between non-defective data on the model for defective or non-defective determination and image data obtained by actually capturing an image of a workpiece is input to the trained model, thereby making it possible to perform defective or non-defective determination, while maintaining the accuracy of a certain level.

Third Exemplary Embodiment

FIGS. 8 to 11 each illustrate a trained model generation method according to a third exemplary embodiment. The present exemplary embodiment differs from the second exemplary embodiment in that difference information indicating a difference between captured image data on a single workpiece and shift image data is input to a learning model. In other words, the present exemplary embodiment differs from the second exemplary embodiment in that a difference in a workpiece is observed, instead of observing a difference between workpieces. In general, even a small difference in design or characters on each model has an adverse effect on the trained model, and thus there is a need to generate different trained models for the respective models. Like in the present exemplary embodiment, it is determined whether a defect is present based on a difference image in a single workpiece including a predetermined repetitive pattern, thereby eliminating the adverse effect due to the difference in design or characters. Matters other than the matters to be described below are similar to those of the second exemplary embodiment.

In the present exemplary embodiment, it is assumed that a product including an area with the predetermined repetitive pattern is used as a workpiece. Examples of the workpiece include wallpaper, seal, woodgrain paper, woven fabric, and tableware. It is assumed that a product having a design or material with the predetermined repetitive pattern among the above-described products is used as a workpiece. The predetermined repetitive pattern indicates two or more same patterns. The same pattern indicates a repetitive period as illustrated in FIG. 9. A pattern with a repetitive period in which a defect is present in some areas and no defect is present in other areas is also regarded as the same pattern. In other words, as long as a predetermined pattern is repeatedly formed on an area, it is assumed that the area includes the predetermined repetitive pattern even when the pattern includes a defect.

Figure 8A:
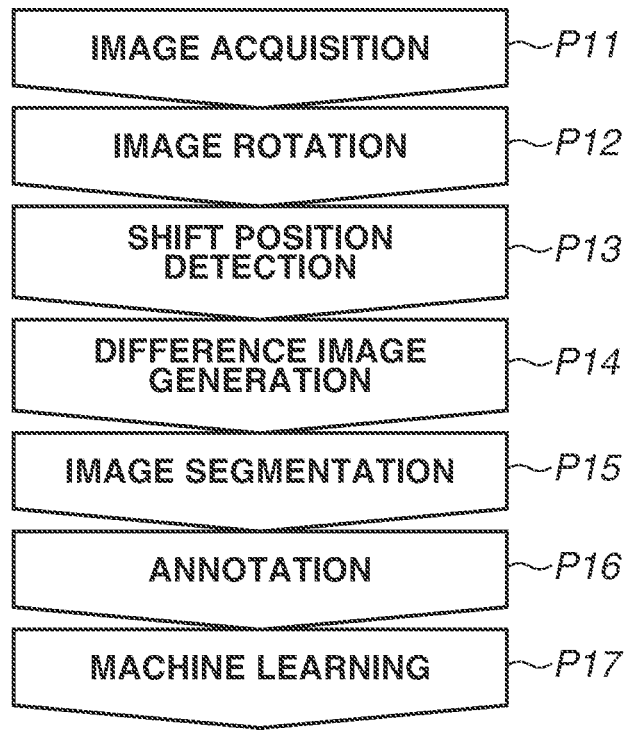
FIG. 8A is an explanatory diagram illustrating a teacher data generation method according to a third exemplary embodiment.

FIG. 8A is a conceptual diagram illustrating the learning phase. The learning phase according to the present exemplary embodiment includes an image acquisition step P11, an image rotation step P12, a shift position detection step P13, a difference image generation step P14, an image segmentation step P15, an annotation step P16, and a machine learning step P17.

In the image acquisition step P11, a captured image is obtained by capturing an image of an area including the predetermined repetitive pattern in a workpiece (first workpiece).

In the image rotation step P12, a rotational direction of the predetermined repetitive pattern is adjusted so that the difference can be appropriately calculated. For example, in the case of the pattern as illustrated in FIG. 9, the captured image is rotated such that linear portions corresponding to outer edges of the captured image become parallel to each other, thereby adjusting the orientation in the rotational direction. Other examples of the method of calculating the rotational direction include a method of detecting a pattern direction included in the predetermined repetitive pattern, and a method of detecting a straight line at an edge of the workpiece (first workpiece). Note that the image rotation step P12 is not essential and the shift position detection step P13 may be carried out after the image acquisition step P11.

In the shift position detection step P13, a shift position from the captured image to generate a shift image is detected. Then, the shift image at the shift position is calculated. The shift position can be appropriately set. To detect the shift position, a reference position is first set. For example, an edge of a predetermined pattern is set as the reference position. Next, a position that is away by the amount corresponding to one or more predetermined patterns is detected as the shift position, and the shift image at the shift position is calculated. An example of a shift position detection method will be described below, but the shift position detection method is not limited to this example.

When predetermined periodic patterns are arranged in a row direction (lateral direction), there is a need to detect a pattern with a highest similarity when a reference predetermined periodic pattern is shifted in the row direction. For example, in FIG. 9, there is a need to detect a pattern with a highest similarity to a periodic pattern including an area a1 and an area b1. The similarity can be obtained by calculating differences between a luminance value (pixel value) of each pixel in the pattern at the reference position and a pixel value of each pixel in a pattern that is away by a predetermined amount in the row direction from the reference position, and by calculating a standard deviation of the differences. A pattern with a minimum standard deviation is determined to be a pattern with a highest similarity, and an image including the pattern with the highest similarity is generated as the shift image. Not that FIG. 9 illustrates a case where the periodic patterns are arranged only in the row direction. However, if the periodic patterns are arranged in a column direction (longitudinal direction) or an oblique direction, a pattern with a high similarity when the patterns are shifted in the column direction or a pattern with a high similarity when the patterns are shifted in the row and column directions may be generated as the shift image.

Next, the difference image generation step P14 is carried out. As illustrated in FIG. 9, in the difference image generation step P14, the difference image between the captured image and the shift image is generated. The difference image that is obtained based on the difference between the captured image and the shift image is less likely to be affected by the predetermined repetitive pattern. In other words, it is possible to check only whether a defect is present in the difference image. This makes it possible to determine whether a defect is present.

Note that as illustrated in FIG. 9, if a defect is present in the captured image, the defect may be left in the shift image depending on the shift position. In this case, if the determination is made based only on the difference image, it is determined that the workpiece is defective only when two defects are present in the workpiece. This leads to a disadvantage that even in a case where a defect is present in the shift image, if the detect is not included in the shift image, it is inevitably determined that the workpiece is non-defective. For this reason, there is a need to eliminate the adverse effect of the defect included in the shift image.

In the present exemplary embodiment, as illustrated in FIG. 10, a difference value between the captured image and the shift image is calculated, and processing of correcting whether a defect is present is performed based on whether the absolute value of the difference value exceeds a predetermined threshold. The correction processing can be changed depending on the object.

Figure 10F:
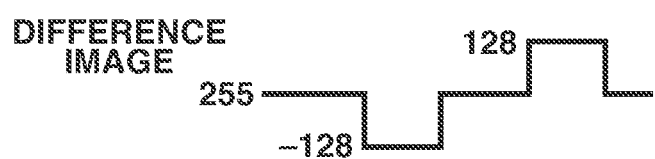
FIG. 10F is an explanatory diagram illustrating the teacher data generation method according to the third exemplary embodiment.
Figure 10G:
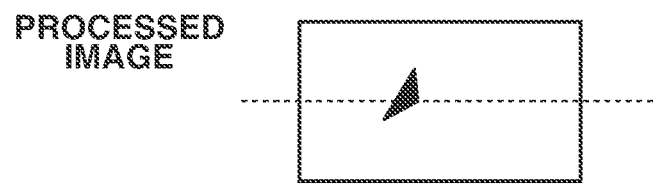
FIG. 10G is an explanatory diagram illustrating the teacher data generation method according to the third exemplary embodiment.
Figure 10H:
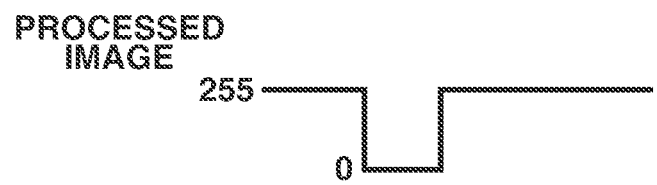
FIG. 10H is an explanatory diagram illustrating the teacher data generation method according to the third exemplary embodiment.

FIG. 10A illustrates image data on the captured image, and FIG. 10C illustrates image data on the shift image. FIG. 10A illustrates only a defect in the captured image and FIG. 10C illustrates only the defect in the shift image, for convenience of explanation, and the illustration of the predetermined periodic pattern is omitted. FIG. 10E illustrates a difference image between FIG. 10A and FIG. 10C, and FIG. 10G illustrates a processed image obtained after the processing of correcting whether the defect is present. FIGS. 10B, 10D, 10F, and 10H illustrate pixel values indicated by broken lines in FIGS. 10A, 10C, 10E, and 10G, respectively. In FIGS. 10A and 10C, the pixel value in the non-defective area is 255 and the pixel value in the defective area is 128. The difference image illustrated in FIG. 10F can be calculated by subtracting the pixel value in the shift image from the pixel value in the captured image. For example, the pixel value corresponding to the defect illustrated in FIG. 10B can be calculated by subtraction of 128−256=−128 (FIG. 10F). Correction processing is performed such that when the result of subtracting the pixel value in the shift image from the pixel value in the captured image indicates a negative value, the area is determined to be a defective area, and when the subtraction result indicates a positive value, the area is determined to be a non-defective area. Thus, in the processed image, the defect area detected in the shift image can be corrected to the non-defective area.

Note that in difference image generation processing, the subtraction result may be multiplied by a predetermined value so as to increase the contrast for the defect. For example, if the pixel value in the processed area is calculated as the subtraction result×2+255, the area can be corrected in a state where the contrast for the area is increased. Accordingly, the correction processing can be accurately performed and only data on the defect in the captured image can be extracted. Therefore, it is possible to learn only data on the defect in the captured image.

The examples illustrated in FIG. 10 assume processing in which correction processing is performed on a workpiece including an area with a small pixel value (gradation) when a defect is present in the area. For example, fiber is used as an object and light passing through the object is captured by the image capturing apparatus to thereby conduct an inspection. Contrary to this example, if correction processing is performed on a workpiece including an area with a large pixel value when a defect is present in the area, the area may be corrected to a non-defective area when the subtraction result indicates a negative value, and the area may be corrected to a defective area when the subtraction result indicates a positive value.

Next, the image segmentation step P15 is carried out. In the image segmentation step P15, the image is segmented into images having sizes for executing AI learning/inference processing. Note that if a defect is present at a boundary portion between segmented images, it is difficult to detect the defect. Accordingly, as illustrated in FIG. 11, in image segmentation, it may be desirable to determine the segmented position in a state where the areas overlap each other.

Next, in the image data obtained in the image segmentation step P15, the learning model is trained with data marking information indicating whether the workpiece is defective or non-defective (annotation step P16). In the annotation step P16, an image may be generated by rotating or translating the image data obtained in the image segmentation step P15, to thereby increase the number of pieces of learning image data. Note that annotation processing may be performed using the processed difference image without performing the image segmentation. The learning model is trained with these pieces of data (machine learning step P17).

Figure 8B:
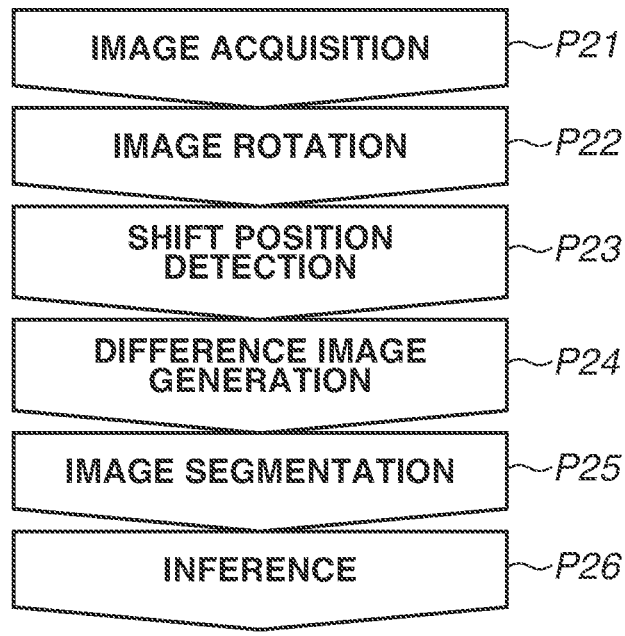
FIG. 8B is an explanatory diagram illustrating the teacher data generation method according to the third exemplary embodiment.

In an inference phase illustrated in FIG. 8B, an image acquisition step P21, an image rotation step P22, a shift position detection step P23, a difference image generation step P24, and an image segmentation step P25 are performed using a workpiece (second workpiece) to be actually inspected. Then, in an inference step P26, the workpiece can be determined to be defective or non-defective. Also, in the inference phase, the image rotation step P22 is not essential, like in the learning phase.

According to the present exemplary embodiment, it is possible to conduct an inspection without the need for creating individual leaning models for different models even when designs or characters on workpieces of the respective models are slightly different from each other. In addition, it is possible to make a determination on different models using the same trained model by inputting a difference image in different models to the same learning model and creating the trained model.

The present invention is not limited to the above embodiments and various changes and modifications can be made within the spirit and scope of the present invention. Therefore, to apprise the public of the scope of the present invention, the following claims are made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to obtain a number of pieces of teacher data required for defective or non-defective determination, while reducing the number of pieces of image data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A system comprising:
an image capturing apparatus;
one or more processors; and
one or more memories storing instructions and a trained learning model configured to receive image data obtained by capturing an image by the image capturing apparatus,
wherein the trained learning model was created
by inputting difference information indicating a difference between first image data obtained by capturing an image of a first workpiece and second image data different from the first image data, wherein the first image data and the second image data were obtained by capturing one or more images of a first workpiece model, wherein the first workpiece is an instance of the first workpiece model, and
by inputting difference information indicating a difference between third image data obtained by capturing an image of a second workpiece and fourth image data different from the third image data, wherein the third image data and the fourth image data were obtained by capturing one or more images of a second workpiece model that is different from the first workpiece model, wherein the second workpiece is an instance of the second workpiece model,
wherein executing the instructions causes the one or more processors and the one or more memories to input difference information indicating a difference between fifth image data obtained by capturing an image of a third workpiece by the image capturing apparatus and sixth image data different from the fifth image data to the trained learning model and make a determination on the third workpiece,
wherein the difference information indicating the difference between the fifth image data and the sixth image data to be input to the learning model indicates information subjected to predetermined processing, and
wherein in a case where an absolute value of a difference value in an area including the difference indicated by the difference information between the fifth image data and the sixth image data exceeds a predetermined threshold, the predetermined processing is processing of correcting the area to an area including no difference.

2. The system according to claim 1, wherein the second image data, the fourth image data, and the sixth image data are each image data obtained by capturing an image of a respective non-defective workpiece.

3. The system according to claim 1,
wherein the first workpiece includes a repetitive pattern,
wherein the second image data indicates a shift image obtained by shifting the first image data by an amount corresponding to one or more repetitive patterns in image data obtained by capturing an image of the first workpiece,
wherein the fourth image data indicates a shift image obtained by shifting the third image data by an amount corresponding to one or more repetitive patterns in image data obtained by capturing an image of the second workpiece, and
wherein the sixth image data indicates a shift image obtained by shifting the fifth image data by an amount corresponding to one or more repetitive patterns in image data obtained by capturing an image of the third workpiece.

4. The system according to claim 1, wherein the determination indicates whether a defect is present.

5. The system according to claim 1,
wherein the third workpiece is a colored part, and
wherein the determination indicates whether the third workpiece is colored with a color different from a predetermined color.

6. The system according to claim 1, further comprising:
a sensor; and
a trigger generation circuit configured to transmit an image capturing trigger signal to the image capturing apparatus,
wherein upon detection of the third workpiece within a predetermined range, the sensor outputs a signal to the trigger generation circuit, and
wherein the image capturing apparatus captures an image of the third workpiece based on the image capturing trigger signal output from the trigger generation circuit based on the signal.

7. The system according to claim 6, further comprising a robot, wherein executing the instructions causes the one or more processors and the one or more memories to cause a workpiece determined to be defective based on the trained learning model to move.

8. A system comprising:
an image capturing apparatus;
one or more processors; and
one or more memories storing instructions and a trained learning model configured to receive image data obtained by capturing an image by the image capturing apparatus,
wherein the trained learning model was created by inputting difference information indicating a difference between first image data obtained by capturing an image of a first workpiece by the image capturing apparatus and second image data different from the first image data, and
wherein executing the instructions causes the one or more processors and the one or more memories to
generate difference information indicating at least one difference between third image data obtained by capturing an image of a second workpiece by the image capturing apparatus and fourth image data different from the third image data, wherein in a case where an absolute value of a difference value in an area including a difference between the third image data and the fourth image data exceeds a predetermined threshold, the difference information indicates that the area includes no difference, and
input the difference information to the trained learning model and make a determination on the second workpiece.

* * * * *